United States Patent [19]

Ekman

[11] Patent Number: 4,493,366
[45] Date of Patent: Jan. 15, 1985

[54] MEANS FOR RECOVERING HEAT FROM A ROOM SPACE, AND FOR VENTILATION

[75] Inventor: Heinz Ekman, Kirkkonummi, Finland

[73] Assignee: Verdal Maskinverksted A/S, Finland

[21] Appl. No.: 438,463

[22] Filed: Nov. 2, 1982

[30] Foreign Application Priority Data

Nov. 3, 1981 [FI] Finland .................................. 813454

[51] Int. Cl.³ ............................ F28D 17/00; F24F 7/00
[52] U.S. Cl. .......................................... 165/54; 165/4; 165/7; 165/5; 126/429; 126/430; 126/436
[58] Field of Search ............................ 165/4, 7, 54, 5; 126/429, 430, 436

[56] References Cited

U.S. PATENT DOCUMENTS 4,049,404  9/1977  Johnson ................................ 165/54

FOREIGN PATENT DOCUMENTS 226739  1/1925  United Kingdom .................... 165/4

Primary Examiner—Albert W. Davis, Jr.

[57] ABSTRACT

A means for recovering the heat of a room space and for ventilation, consisting of at least two heat accumulators, to which the outgoing air delivers its heat and from which the incoming air takes up heat, and each of which has one end connected to the room space outflow duct and inflow duct, in which ducts the direction of flow is always the same under control by a flap. The opposite ends of the heat accumulators have been connected to the fresh air intake duct and to the outgoing exit duct, in which ducts the direction of flow is always the same under control by another flap.

2 Claims, 5 Drawing Figures

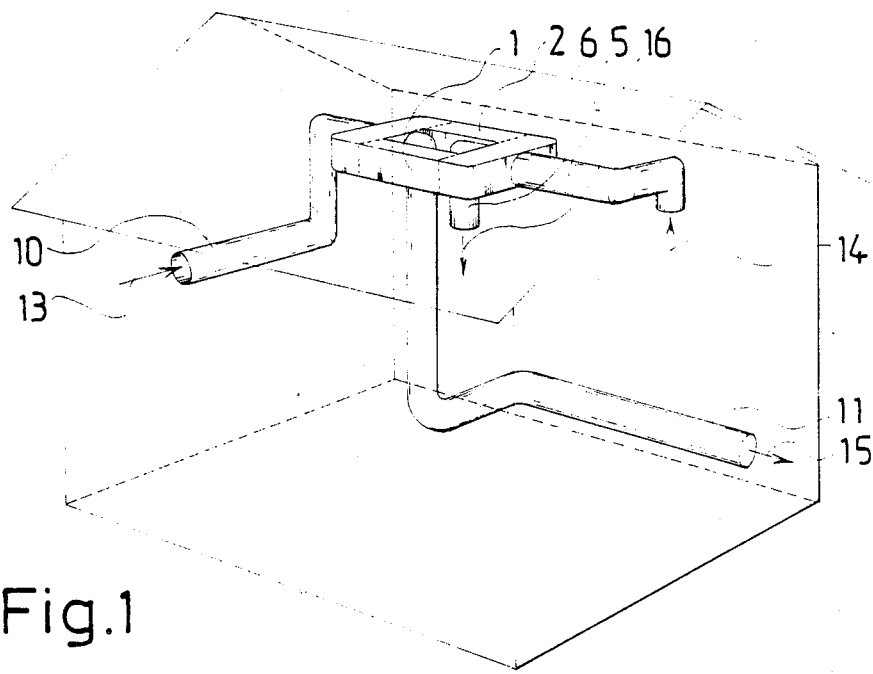
Fig.1
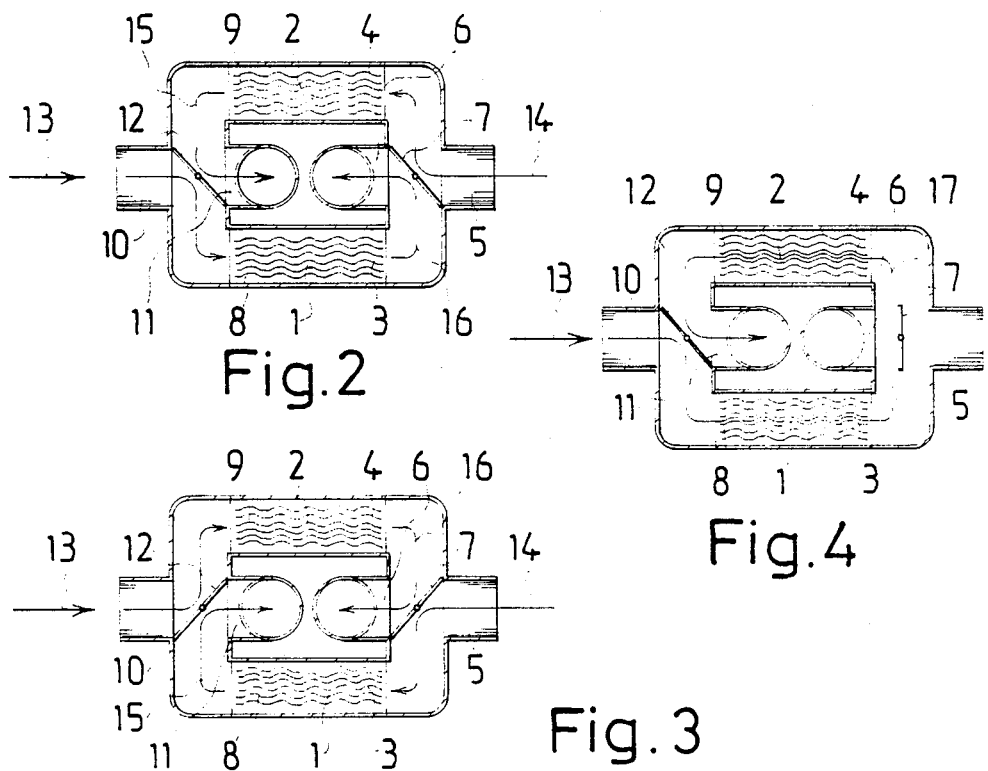
Fig.2
Fig.3
Fig.4

MEANS FOR RECOVERING HEAT FROM A ROOM SPACE, AND FOR VENTILATION

The present invention concerns a means for recovering heat from a room space and for ventilation, said means consisting of at least two heat accumulators to which the outgoing air delivers its heat content and from which the incoming air takes heat and each of which has one end connected to the outflow duct and inflow duct of the room space, the direction of flow in these ducts being invariably the same under control by a flap.

The drawback encumbering a means of this type known in the art is that the heat accumulators have to be disposed at a location where they communicate immediately with external air in order to ensure that the outgoing air will not in connection with the reversal of direction flow back into the room space. In spite of the fact that the heat accumulators have for instance been placed immediately inside the outer wall, that part of the air which is in the heat accumulator will unavoidably return to the room space in connection with reversal.

The object of the invention is to eliminate all the drawbacks mentioned above. The means of the invention is characterized in that the opposite ends of the heat accumulators have been connected to the fresh air intake duct and to the outgoing exit duct, in which ducts the direction of flow is invariably the same under control by a second flap. Owing to the invention, the means can be mounted anywhere in the house, because the direction of flow in the fresh air intake duct and in the outgoing exit duct is always the same.

An advantageous embodiment of the invention is characterized in that the flaps have been mutually synchronized so that the flap associated with the outflow duct and inflow duct of the room turns before the other flap, at least so much earlier as to cause the fresh incoming air to circulate a brief while in both heat accumulators and to return to the outdoor atmosphere. Hereby both heat accumulators will be ventilated by means of fresh air and not even the least quantity of outgoing air will return to the room. This is indispensable e.g. in hospitals or in industry where the outgoing air may contain poisonous gases.

Another embodiment of the invention is characterized in that the fresh air intake duct has been connected to a heat source, for instance a solar panel. Hereby it is then possible e.g. on sunny days to gain heat from solar energy. The electronics incorporated in the equipment sense the temperature differences and automatically control the equipment to operate as desired: as a heating means or as a means for recovering heat.

The invention is described in the following with the aid of an example, with reference to the attached drawings, wherein FIG. 1 presents the means, disposed within a house.

FIGS. 2, 3 and 4 illustrate, in sectional representations, the various functions of the means.

Figure 5:
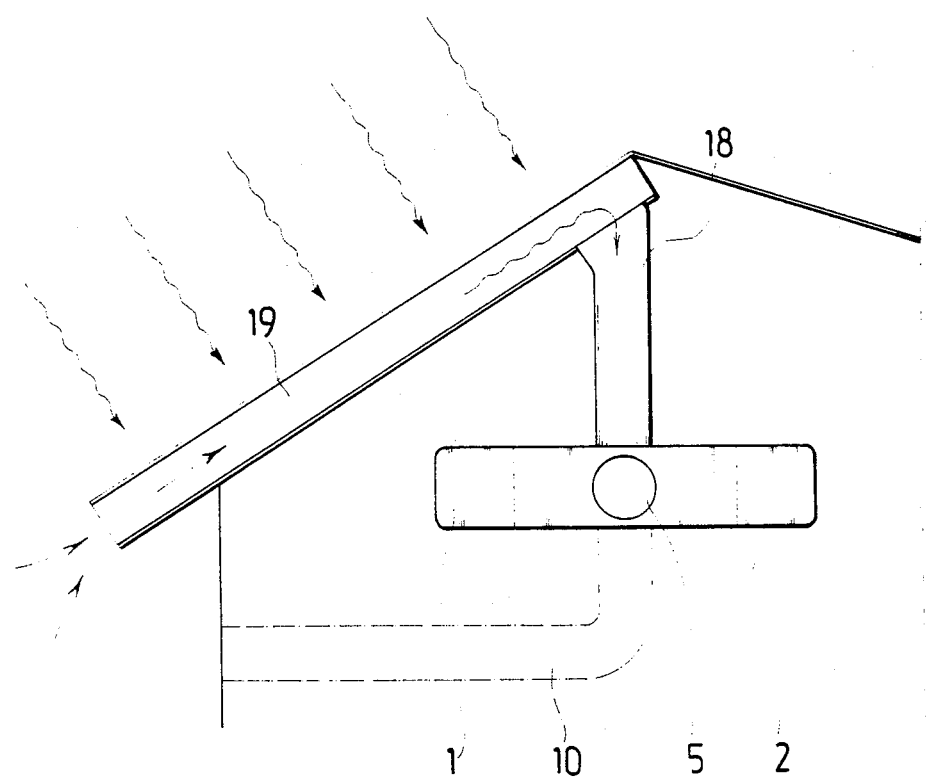
FIG. 5 shows a solar panel connected to the means.

The means consists of two heat accumulators 1,2, to which the outgoing air delivers its heat and from which the incoming air draws heat. One end of each heat accumulator, 3,4, has been connected to the outflow duct 5 and inflow duct 6 of the room space, in which ducts the direction of flow is always the same under control by a flap 7. The opposite ends 8,9 of the heat accumulators 1,2 have been connected to the fresh air intake duct 10 and to the outgoing exit duct 11, where the direction of flow is always the same, under control by another flap 12. The arrow 13 indicates the entrance of fresh air. The arrow 14 indicates the outflow of warm room air, arrow 15 indicates the outflow of air that has given off its heat. The arrow 16 indicates the entrance of the heated air drawn from the outside.

The flaps 7,12 have been mutually synchronized so that the flap 7 associated with the outflow duct 5 and inflow duct 6 of the room space will turn before the other flap 12, at least so much earlier that the fresh air will circulate, as shown by the arrow 17, during a brief moment through both heat accumulators 1,2 and return to the outside atmosphere. Hereby the apparatus will be aired, and nothing of the air outflowing from the room space will return to the room.

In the embodiment depicted in FIG. 5, the fresh air inflow duct 18 has been connected to a solar panel 19 on the roof of the house. When the incoming air is at a temperature higher than the outgoing air, the electronics incorporated in the apparatus automatically switch the means to operate as a heating means. When the temperature of the incoming air once again falls below that of the air in the interior space, the apparatus automatically becomes a means for recovery of heat from the room air.

Since it is possible to accommodate the means anywhere, for instance in the basement or attic, which are spaces that cannot be otherwise utilized, more space needed for other purposes is gained. The adjustments and functions of the means are manageable by simple electronics. The means has proved to be reliable in service and its efficiency is even as high as 85 to 90%. The means is highly suitable for use in hospitals, where means of this kind could not be installed heretofore.

It is obvious to a person skilled in the art that the invention is not confined to the example above presented and may, instead, vary within the scope of the claims stated below.

I claim:

1. Means for recovery of heat from air from a room and for ventilation of said room, comprising at least two heat accumulators to which outgoing air from said room delivers its heat and from which incoming air takes heat, a room air outflow duct and a room air inflow duct, each accumulator having one end thereof connected to said outflow and inflow ducts, the direction of flow of air in said ducts being always the same, a flap for controlling the flow of air in said outflow and inflow ducts, a fresh air intake duct and an outgoing exit duct, each accumulator having the opposite end thereof connected to said fresh air intake duct and said outgoing duct, the direction of flow of air in said fresh intake and outgoing exit ducts being always the same, and a second flap for controlling the flow of air in said fresh air intake and outgoing exit ducts, said flaps being synchronized with each other so that the flap associated with the room space outflow duct and inflow duct turns before the second flap, at least that much earlier that the fresh incoming air will circulate a little while through both heat accumulators and escape back to the outdoor atmosphere.

2. Means according to claim 1, wherein the fresh air intake duct has been connected to a heat source, such as a solar panel.